Josef Lukas
Klaus von Dohlen

INVENTORS

United States Patent Office 3,515,176
Patented June 2, 1970

3,515,176
COIL WINDING MACHINES
Josef Lukas, Augsburg, and Klaus von Dohlen, Haunstetten, Germany, assignors to Patent-Treuhand-Gesellschaft für Elektrische Gluhlampen mbH., Munich, Germany, a corporation of Germany
Filed May 28, 1968, Ser. No. 732,655
Claims priority, application Germany, June 2, 1967, P 42,270
Int. Cl. B21f 3/04
U.S. Cl. 140—71.5                                  12 Claims

ABSTRACT OF THE DISCLOSURE

Coiling machine in which wire is drawn from its reel by centrifugal force and fed directly to a rotating spindle, which, in absence of conventional bearings, is supported and retained by line contact with and transverse to peripheries of wheels of much greater diameter than the spindle.

PROBLEM AND SOLUTION INVOLVED

Figure 1:
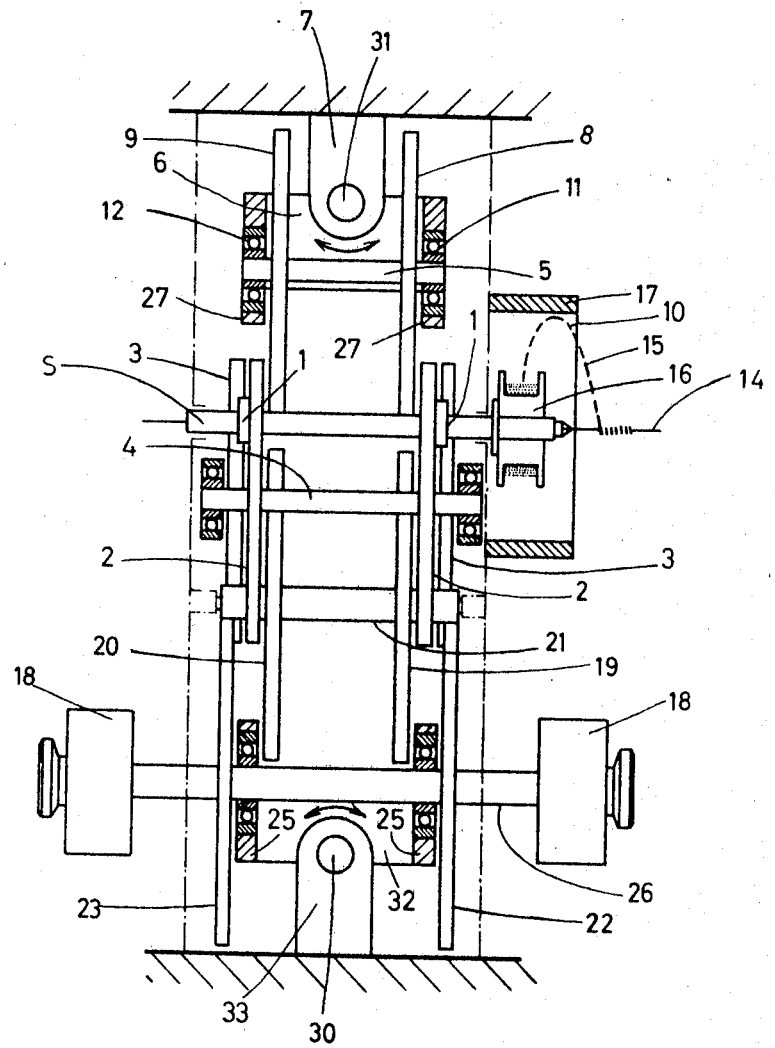

Filaments, as used in electric lamps and discharge tubes in the form of coiled wire, have heretofore been made commercially by winding the wire onto a generally somewhat thicker mandrel or core wire which progresses longitudinally as the filament wire is wound thereon. Usually the mandrel is made from a different material than the coiled wire so it may be subsequently removed from the coil by using suitable dissolving means. Coiling machines of this character have a rapidly rotating hollow spindle through which the mandrel is drawn continuously, whereas the wire to be coiled is located on a supply reel arranged co-axially on the spindle and connected therewith through agency of a slipping clutch. The wire is unwound from the reel and passes to and over a guide roller and is carried from thence to the mandrel or core wire. The slippage of the clutch and uncertainties in feed of the wire over the guide roller introduce uncertainties in the ultimate coil.

In the manufacture of such coiled wire filaments, such as for incandescent electric lamps, the coiled wire usually consists of tungsten and the mandrel or core wire may suitably be molybdenum. For lamps of low current intensity, the coiled wire may have diameters below twenty microns (20μ) down to eight microns (8μ) or even less, whereas the mandrel diameter in such cases is chosen between thirty and one hundred microns. The distance between the turns of the coiled wire on the mandrel, technically known as the pitch, must be of a definite amount and must be extremely constant, because the slightest variations have a bad influence on the quality of the lamps manufactured therewith. Prior art machines have been deficient in this respect. In lamps for higher operating voltages the coiled filament wire must have a great many turns on the mandrel in order to have the required length of the coiled wire. That means that the highest possible coiling speed should be used, but with conventional ball bearings or roller bearings for the spindle, a speed of six thousand revolutions per minute of the mandrel seems to be about the maximum within which even reasonably good results may be obtained. That speed obviously limits the rate of production of the ultimate filaments.

Consequently, it will be seen that the accuracy and rate with which such coils may be manufactured, is influenced by the exactness with which the spindle is positioned and operated, as well as by speed of rotation within limitations of perfect balance through avoidance or control of possible unbalance introduced by such factors as the drive for the spindle, the guide roller and vibration and other deficiencies of the bearings, and so forth. The present invention is directed to correction of these prior-art deficiencies.

One feature of improvement in the construction of such coiling machines according to the present novel proposal, consists in omitting the guide roller, with its deficiencies, in passing the wire from the reel to the mandrel. Instead, the supply reel is tightly attached to the spindle and is driven so fast thereby that the coil wire will be drawn off under the effect of centrifugal force only. A hollow cylindrical casing circumferentially surrounding the reel at a radial distance therefrom may also be rotated therewith and confines and defines the extent of the loop of the wire formed in consequence of the centrifugal force. That loop extends from the supply reel, in a wide orbit within the cylindrical casing, toward the coil progressively made on the mandrel. To obtain the required centrifugal action for feeding the wire to form the loop continuously as the wire winds on the mandrel, high speed approximating 20,000 revolutions per minute for the reel and spindle is utilized, such speed also producing the beneficial result of obtaining increased rate of production of the desired filaments. Moreover, this high speed of operation and rapidity of production are compatible to the winding of coils on extremely thin mandrel or core wires.

However, this high speed proposal has introduced a serious obstacle, namely, difficulty in location and operation of the spindle with sufficient exactitude. It has been found that with the further increase of the number of revolutions of the spindle to and above 20,000 r.p.m., neither friction bearings nor roller bearings function continuously in satisfactory manner, and that a gear drive as required in order to obtain an exact proportion of the number of revolutions of the spindle to the advance of the mandrel wire, does not permanently supply an acceptable result due to the unavoidable play and unavoidable irregularities in the gear-tooth system. The forces involved for coiling such thin wires as used for lamp filaments are indeed quite small so that axially located point support for the spindle could be taken into consideration, but that solution is inapt and must be excluded because the spindle has to be axially hollow so that the core wire or mandrel may pass therethrough. So the present invention has evolved in overcoming the mentioned objections, by a novel operational mounting of the spindle without use of conventional bearings, but by inclusion of the spindle between large wheels providing both support and retention thereof and circumferential surface travel commensurate to that of the spindle.

Figure 2:
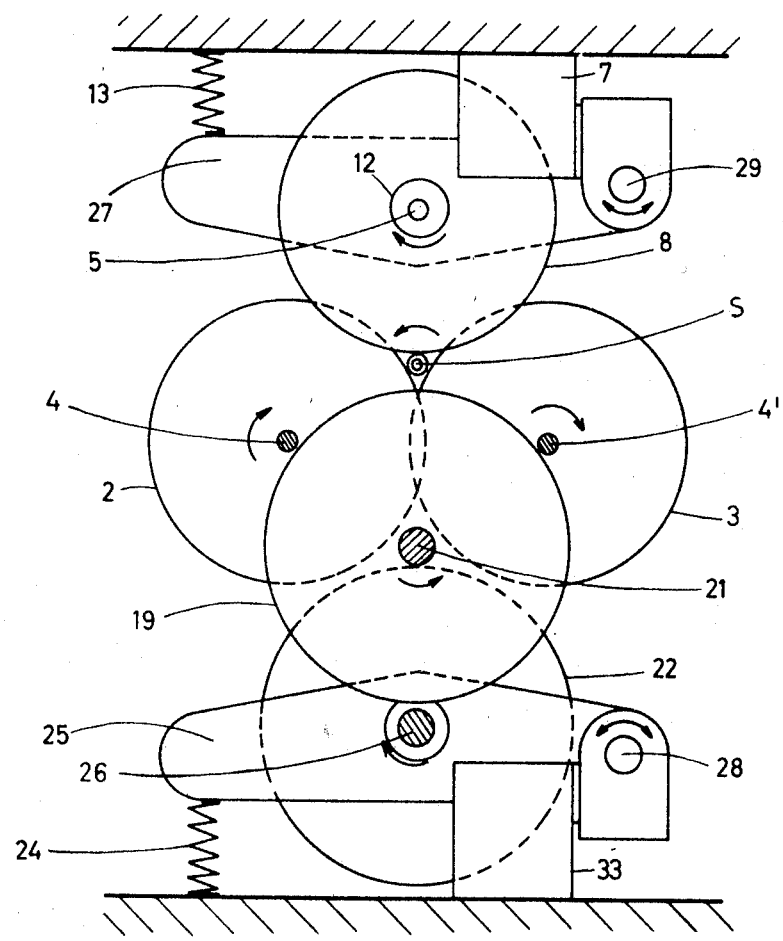

In the drawings:

FIG. 1 is a side view of the essentials of a coil winding machine embodying the invention; and FIG. 2 is a front view thereof.

DETAIL DESCRIPTION

A freely rotatable hollow spindle S is provided which extends horizontally cross-wise of the winding machine, and is retained against longitudinal movement by any suitable means such as by collars 1 fixed thereon positioned to ride against any suitable abutment appropriately situated for the purpose. For orienting purposes and convenience in description, an imaginary vertical plane containing the axis of said spindle longitudinally therein will be considered as present and will be referred to as the center or central plane of the machine. At a distance in front of said central plane, at a level below the location of the spindle and axially parallel thereto, there is a driving axle 4 having appropriate mounting, for instance in ball-bearings, and functioning as a drive shaft by appropriate application of rotary force applied thereto from a selected source of power (not shown). At the same level as said driving axle 4 but in the rear of said plane and similarly mounted for rotation, is an idler axle 4'.

Fixed on said driving axle 4 near opposite sides of the machine and parallel to each other, are two relatively large wheels 2, 2 of precisely equal diameter one to the other and rotatable simultaneously with said driving axle. Two similar wheels 3, 3 are fixed on the idler axle 4' also separated from each other and here shown as further toward the sides of the machine than the first-mentioned pair. The spacing apart of the axes of the two axles, and the diameters of said wheels is such that said wheels of one axle overlap the wheels of the other axle at front and back of said center plane. Also, the level of said axles below the level of said spindle, is a distance considerably less than the radius of said wheels, in consequence of which said spindle S may have a location in what may be termed the upper crotch of the overlapping wheels. The entire support for said spindle is from its engagement with said wheels in its location in said crotch. Since the initiation of drive is through large wheels 2, 2, the rate of rotation of the spindle is many times faster, so that rotation of over 20,000 r.p.m. for the spindle is easily attainable by a direct motor drive on shaft or axle 4 having a considerably less speed. Just by way of example, the proportions shown in the drawings would develop an increase of spindle speed over the driving axle speed of approximately sixteen to one. Proportionately larger wheels to size of the spindle would of course gain greater speed ratio.

In order to maintain the spindle at a precise constant location and prevent it from riding up on the circumference of wheels 3, 3, the peripheries of which are rotating in an upward direction proximate to the spindle, parallel confining wheels 8, 9 of equal size one to the other are carried by a horizontal upper shaft 5 the axis of which is within said central plane and in parallelism to and above said spindle S. These said confining wheels 8, 9 are proximate to and located with segments of their peripheral margins overlapping with respect to the spindle-driving wheels 2, 2. Rotation of the spindle with said confining wheels in contact therewith, obtains rotation of said confining wheels, which consequently perform their confining function with minimum retarding effect upon rotation of the spindle. Suitable spring-loading may be provided for said confining wheels to exert appropriate pressure thereof against the spindle, thereby retaining the spindle in the crotch of the supporting wheels and in constant contact with the peripheries thereof.

As shown, said upper shaft 5 on which the confining wheels 8, 9 are secured, rotates in non-friction bearings 11, 12 fixed in respective arms 27 proximate to and at the outer sides of said wheels. Said arms are horizontally disposed and have length exceeding the diameter of said wheels, thereby projecting forwardly and rearwardly beyond the peripheries of the wheels with said bearings situated approximately midway of the lengths of the arms. Next to the rear ends of said arms, extending therebetween, is a cross-head 6 providing pivotal means, such as pintle 29, by which said arms may have an up and down amplitude of swing. Furthermore, said cross-head 6 has a lateral pivotal mounting by a pivot pin 31 extending in a direction transverse to said pintle 29 and axially in parallelism to said arms. That pivot pin 31 is carried by a suitable lug 7 or other fixed part of the machine. By this, or equivalent structure, the arms have what may be termed a universal swing characteristic, namely, both a vertical swing and in addition a lateral teetering for equalizing engagement of the confining wheels 8, 9 against the spindle. Supplemental to gravitational depression of the confining wheels into engagement with the spindle, spring-loading may also be applied, an example of which is indicated by the inclusion of springs 13 above each arm 27 held under compression below a fixed part of the machine.

The core wire 14 does not rotate, but is propelled longitudinally through the fast-rotating hollow spindle S, and where leaving the spindle, has the coil wire 15 wound around it, thereby producing the desired coil. The reservoir of coil wire is contained in a supply reel 16 which is fixed coaxially upon the forward end portion of the spindle and rotates at high speed therewith. The rapidity of rotation creates a centrifugal force effective upon the coil wire, the result of which is that the section of the coil wire leaving the reel and passing to the mandrel, forms a loop 10, thereby avoiding the need for a guiding means as heretofore required in coil-winding machines. The extent and character of the loop 10 is confined and defined by presence of an annular coiling pot or cylindrical casing 17 spaced radially outwardly from the spindle and functioning to deflect the coil wire back toward the spindle. This coiling pot or casing 17 preferably is coaxial to the spindle but does not need to rotate, so may be mounted in fixed position on the machine. By use of alumina, tungsten, or other hard metal as the material of which the coiling pot, or at least its inner cylindrical face, is composed, the rubbing of the loop thereagainst will have no ill effect.

As in prior art coiling machines, the core wire 14 is fed at predetermined rate from a feed drum 18. In the present showing, the drive may be effected by a reducing ratio of speed from the driving axle or shaft 4, to thereby synchronize the rate of feed of the mandrel wire to the speed and rate of winding of the coil wire. For this purpose, a pair of coaxial parallel speed-reducing wheels 19, 20 spaced from each other at locations inwardly from the respective wheels 2 and 3 above described, make peripheral engagement with axles 4 and 4'. Said speed-reducing wheels 19, 20 are mounted upon and are rotatable with a floating axle 21 which supplies adequate movement enabling said speed-reducing wheels to maintain frictional engagement against said axles 4 and 4'. Said reducing wheel floating axle 21 passes through the lower crotch of afore-mentioned wheels 2 and 3, but without making engagement with either of those wheels. It will be recognized that the axis of said axle 21 lies substantially in the above-described central plane of the machine. Beneath said axle 21 in peripheral supporting engagement therewith are two more slow-turning wheels 22, 23 fixed on an axle 26 the axis whereof is also longitudinally in said central plane. This last-mentioned axle 26 is vertically movable and under influence of an upward spring loading so that the slow-turning wheels thereon will be constantly pressed into peripheral engagement against the speed-reducing axle 21.

Equalized and spring-loaded mounting for the slow-turning wheels 22, 23 and associated axle 26 corresponds in structure closely to that above described for the confining wheels 8, 9 and their axle 5. Accordingly, it will be observed that said slow-turning axle 26 is carried by arms 25 pivoted at their rear ends on a pintle 28 projecting from a cross-head 32 which in turn has pivotal mounting at right angles to the first-mentioned pivoting of the same, by a pivot 30 carried by a lug 33 representing a fixed part of the machine. These lower arms 25 therefore are accorded what may again be termed a universal swing or hinge mounting of like nature to that previously described for the upper arms 27. Springs 24 under the forward ends of the lower arms 25 under compression from a fixed part of the machine therebelow, apply the desired spring-loading to the arms and to said slow-turning axle 26 and wheels 22, 23.

It should be appreciated from the foregoing, that both the speed-drive and the slow-drive, accomplished by the frictional engagement of the several wheels and axles, as well as with the spindle, are structures wherein slippage is abhorrent and synchronization is essential. Achievement of this desirable characteristic is augmented by utilizing high-quality wear-resistant synthetics, as polyurethanes, materials on the basis of polyester-isocyanite addition, polytetrafluorethylene. Other usable materials are hard rubber as well as alumina.

We claim:

1. A coiling machine for coiled wire filaments of incandescent lamps and discharge tubes, in combination with a speedily rotating hollow spindle through which a mandrel wire is propelled, said mandrel wire where emerging from said spindle having a coil wire wound therearound by virtue of rotation of said spindle, said spindle being devoid of retention in conventional bearings, and a plurality of overlapping wheels the overlap whereof forms a crotch therebetween, said wheels being comparatively much larger than said spindle, and said wheels having peripheral contact with said spindle supporting and locating the spindle in said crotch.

2. A coiling machine in accordance with claim 1, wherein the supporting wheels are arranged in pairs with each pair on an axle common to both wheels of the pair.

3. A coiling machine in accordance with claim 2, wherein said spindle is supported by two pairs of wheels and at least one pair of wheels is located in position to confine the spindle in engagement with said supporting pairs of wheels.

4. A coiling machine in accordance with claim 3, wherein spring-loading is applied to one pair of wheels in a direction maintaining engagement of all of said wheels against said spindle.

5. A coiling machine in accordance with claim 1, wherein one of said wheels is power actuated and by peripheral engagement with said spindle rotates the spindle at a much higher speed.

6. A coiling machine in accordance with claim 2, wherein one pair of wheels has a universal mounting equalizing engagement of all of said wheels with the spindle.

7. A coiling machine in accordance with claim 1, wherein a mandrel drum is provided, and an operative chain of speed-reducing wheels provided from and with rotation instigated by contact of one of the speed-reducing wheels with the said spindle.

8. A coiling machine in accordance with claim 7, wherein spring-loading is applied to one of said speed-reducing wheels in a direction maintaining said chain of speed-reducing wheels successively operated from one to another.

9. A coiling machine in accordance with claim 1, wherein said wheels are of material from the group of polyurethanes, products of the polyester isocyanate addition and polytetrafluorethylene.

10. A coiling machine in accordance with claim 1, wherein a reel of filament wire is speedily rotated with said spindle and by centrifugal force creates a loop of filament wire in transition from the reel to the mandrel wire.

11. A coiling machine in accordance with claim 1, wherein the spindle speed attains at least 20,000 revolutions per minute.

12. A coiling machine in accordance with claim 10, wherein a coiling pot radially outward from the end of the spindle where the coiling is performed surrounds the same and confines and defines the said loop on its transition from reel to mandrel wire.

References Cited

UNITED STATES PATENTS 3,315,508  4/1967  Mikina, et al. _____ 140—71.5

LOWELL A. LARSON, Primary Examiner

U.S. Cl. X.R.

72—66